United States Patent
Wang et al.

(10) Patent No.: US 9,249,719 B2
(45) Date of Patent: Feb. 2, 2016

(54) TURBINE DEVICE

(71) Applicant: Kangyue Technology Co., Ltd., Shouguang (CN)

(72) Inventors: Hang Wang, Shouguang (CN); Chao Ma, Jinan (CN); Zhifu Zhu, Shouguang (CN); Yongtai Li, Shouguang (CN); Congcong Wang, Shouguang (CN); Lihua Song, Shouguang (CN); Xilu Guo, Shouguang (CN)

(73) Assignee: KANGYUE TECHNOLOGY CO., LTD., Shouguang (CN)

( * ) Notice: Subject to any disclaimer, the term of this patent is extended or adjusted under 35 U.S.C. 154(b) by 414 days.

(21) Appl. No.: 13/757,840

(22) Filed: Feb. 3, 2013

(65) Prior Publication Data

US 2013/0142650 A1    Jun. 6, 2013

Related U.S. Application Data

(63) Continuation-in-part of application No. PCT/CN2010/002167, filed on Dec. 27, 2010.

(30) Foreign Application Priority Data

Aug. 3, 2010    (CN) .......................... 2010 1 0242862

(51) Int. Cl.
| | |
|---|---|
| *F02B 37/02* | (2006.01) |
| *F02B 37/18* | (2006.01) |
| *F01N 13/10* | (2010.01) |
| *F02B 67/10* | (2006.01) |
| *F01D 25/30* | (2006.01) |

(52) U.S. Cl.
CPC ................ *F02B 37/18* (2013.01); *F01D 25/30* (2013.01); *F01N 13/10* (2013.01); *F02B 37/025* (2013.01); *F02B 67/10* (2013.01); *F05D 2220/40* (2013.01); *Y02T 10/144* (2013.01)

(58) Field of Classification Search
CPC ..... F01D 25/30; F01D 2220/40; F01D 37/18; F02B 57/10
See application file for complete search history.

(56) References Cited

U.S. PATENT DOCUMENTS

| | | | | |
|---|---|---|---|---|
| 3,313,518 | A | * | 4/1967 | Nancarrow ...................... 415/13 |
| 4,389,845 | A | * | 6/1983 | Koike ............................ 415/145 |
| 6,553,762 | B2 | * | 4/2003 | Loffler et al. ................. 415/203 |
| 2012/0099964 | A1 | * | 4/2012 | Wang et al. ................... 415/144 |

* cited by examiner

*Primary Examiner* — Igor Kershteyn
(74) *Attorney, Agent, or Firm* — Matthias Scholl, PC; Matthias Scholl

(57) ABSTRACT

A turbine device, including: a turbine housing including an inlet, a flow channel, an outlet, a middle partition, an arced partition; a turbine impeller; a gas outlet; and an exhaust manifold. The turbine impeller and the gas outlet are arranged inside the turbine housing. The exhaust manifold is connected to the inlet. The flow channel is arranged inside the turbine housing. The outlet is arranged on the flow channel close to the turbine impeller. The middle partition is disposed inside the flow channel and divides the flow channel into a left flow channel and a right flow channel. The arced partition is arranged in both the left and right flow channels. One end of the arced partition is in a rigid connection with the middle partition, and the other end of the arced partition is close to the outlet of the turbine housing.

17 Claims, 10 Drawing Sheets

TURBINE DEVICE

CROSS-REFERENCE TO RELATED APPLICATIONS

This application is a continuation-in-part of International Patent Application No. PCT/CN2010/002167 with an international filing date of Dec. 27, 2010, designating the United States, now pending, and further claims priority benefits to Chinese Patent Application No. 201010242862.7 filed Aug. 3, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a compression device for an internal combustion engine, and more particularly to a turbine device with a variable flow for a vehicular turbocharger.

2. Description of the Related Art

In multi-cylinder engines, a double channeled turbine housing has been widely applied for employing the pulse energy produced by each opening of different cylinders. As shown in FIG. 1, a turbine of a conventional double channeled turbocharger includes: a turbine housing 1, an impeller 2, and a gas outlet 3. A flow channel of the turbine housing is divided into a left flow channel 4a and a right flow channel 4b by a middle partition 5.

In normal operating conditions, inlets of both the left flow channel 4a and the right flow channel 4b are connected to exhaust manifolds of different cylinders of the engine. The cylinders exhaust gas in the way of a pulse which flows into the left flow channel 4a and the right flow channel 4b and passes turbine nozzles; the gas flow finally reaches the turbine impeller 2 and does work in a flow channel of the turbine impeller 2 via expansion. Thus, the turbine impeller 2 is initiated into rotating and drives the compressor impeller to rotate via a turbine shaft, thereby achieving the supercharging of the engine. The gas after doing work flows into an exhaust main of the engine via the gas outlet 3.

However, if the double channeled turbine housing 1 is designed to match an engine at high operating conditions, when the engine is at a low operating condition, the gas flow is minimized. The flow channel of the turbine housing 1 has a relatively large volume, the pulse wave of the gas is correspondingly reduced, and thus, the pulse energy cannot be effectively used. If the double channeled turbine housing 1 is designed to match the engine at low operating conditions, the turbine housing 1 is relative small; and when the engine is at a high operating condition, a velocity of the flow inside the turbine is increased, and the flow loss is correspondingly increased. In the meanwhile, a relative small turbine housing has a poor performance of thermal load when the engine is at a high operating condition.

To satisfy the exhausting performance of high and low load of the engine and to improve the efficiency of the turbine, a plurality of turbine devices with variable cross section have been developed based on the double channeled turbine. However, the conventional turbine with variable cross section and the corresponding exhaust manifold of the engine are independently designed, so that the two are not well matched, thereby impacting the performance of the turbine. In the conventional turbine with variable cross section, the valve is arranged inside the turbine housing, which results in a flow loss at the valve. In the meanwhile, the conventional flow channels of the turbine housing are seldom well matched with the multi-cylinder engine, and a reasonable arrangement of the exhaust pulse is restricted.

SUMMARY OF THE INVENTION

In view of the above-described problems, it is one objective of the invention to provide a turbine device that can effectively use the energy of the exhaust pulse whenever the engine is at high or low operating condition.

To achieve the above objective, in accordance with one embodiment of the invention, there is provided a turbine device, comprising: a turbine housing, the turbine housing comprising an inlet, a flow channel, an outlet, a middle partition, an arced partition; a turbine impeller; a gas outlet; and an exhaust manifold. The turbine impeller and the gas outlet are arranged inside the turbine housing. The exhaust manifold is connected to the inlet of the turbine housing. The flow channel is arranged inside the turbine housing. The outlet of the turbine housing is arranged on the flow channel close to the turbine impeller. The middle partition is disposed inside the flow channel and divides the flow channel into a left flow channel and a right flow channel The arced partition is arranged in both the left flow channel and the right flow channel; one end of the arced partition is in a rigid connection with the middle partition, and the other end of the arced partition is close to the outlet of the turbine housing.

In a class of this embodiment, the arced partition arranged inside the left flow channel divides the left flow channel into a left outer flow channel and a left inner flow channel. The arced partition and the turbine housing are welded as a whole. The arced partition arranged inside the right flow channel divides the right flow channel into a right outer flow channel and a right inner flow channel.

The left outer flow channel, the left inner flow channel, the right outer flow channel, and the right inner flow channel are all connected to the outlet of the turbine housing.

In a class of this embodiment, to minimize the flow loss in the outlet of the turbine housing, an outer arced surface of the arced partition in the left outer flow channel is in parallel with an inner arced surface of the left outer flow channel of the turbine housing at a position close to the outlet of the turbine housing.

An inner arced surface of the arced partition in both the left inner flow channel and the right inner flow channel is in parallel with a wall surface of the middle partition in the left inner flow channel and the right inner flow channel at the position close to the outlet of the turbine housing, respectively.

When the motor is at a high operating condition of the motor, to control the angle of the waste gas flowing into the turbine impeller from the left outer flow channel and the right outer flow channel, and to fully utilize the energy of the waste gas, a static cascade is arranged in an entire circle in each of the left outer flow channel and the right outer flow channel close to the outlet of the turbine housing. A blade of the static cascade is inclinedly arranged at an outlet of the outer flow channel. The blade of the static cascade is arranged on the inner surface of the turbine housing by welding.

The arced partition is tapered along a direction of the flow, which is the same as the inner surface of the turbine housing. A total cross sectional area of the left inner flow channel and the right inner flow channel is ⅓-½ of a total cross sectional area of the flow channel.

In a class of this embodiment, a first mounting plate is disposed at the inlet of the turbine housing. The first mounting plate comprises inlet holes respectively connected to the left outer flow channel, the right outer flow channel, the left inner flow channel, and the right inner flow channel.

In a class of this embodiment, a second mounting plate is disposed at an outlet of the exhaust manifold and connected to the first mounting plate. The second mounting plate comprises outlet holes. The number and arrangement of the outlet holes are the same as the number and arrangement of the inlet holes of the first mounting plate.

In a class of this embodiment, the exhaust manifold comprises four exhaust channels, the four exhaust channels comprising two outer exhaust channels and two inner exhaust channels. Each of the outer exhaust channel is connected to the left outer flow channel and the right outer flow channel of the turbine housing, respectively; and each of the inner exhaust channel is connected to the left inner flow channel and the right inner flow channel of the turbine housing, respectively.

To minimize the flow loss at the valve and the space in the exhaust pipes when the engine is at a low operating condition, and to further improve the availability of the energy of the exhaust pulse, a valve is disposed in each outer exhaust channel at a position close to the outlet of the exhaust manifold. One end of the valve is in hinge joint with a wall of the exhaust manifold.

When the engine is at a high operating condition, the vale opens, and the gas flows into the four flow channels of the turbine housing. When the engine is at a low operating condition, the valve closes, so that the gas flows into the two inner flow channels of the turbine housing.

In a class of this embodiment, a partition is arranged in the right inner flow channel and the right outer flow channel close to the outlet of the turbine housing. A cross section of the partition is in a shape of an arc, and a radian of the arc is 0-180°. An outlet of the right inner flow channel and an outlet of the right outer flow channel are sealed at a position of the partition. The original blades of the static cascade arranged at the position of the partition are deleted.

When the valve opens, the gas from outlets of both the left outer flow channel and the left inner flow channel does work on the turbine impeller in a range of an entire circle. The gas from outlets of both the right outer flow channel and the right inner flow channel does work on the turbine impeller in a range from an angle of one end of the partition to 360° in a cross section.

When the valve closes, the gas is kept out of the left outer flow channel and the right outer flow channel and all flows into the left inner flow channel and the right inner flow channel. The gas from the outlet of the left inner flow channel does work on the turbine impeller in a range of an entire circle; while the gas from the outlet of the right inner flow channel does work on the turbine impeller in a range from an angle of one end of the partition to 360° in a cross section.

In a class of this embodiment, a partition is arranged symmetrically at an outlet of the left outer flow channel and an outlet of the right outer flow channel; a cross section of the partition is in a shape of an arc; and a radian of the arc is 0-180°. The original blades of the static cascade arranged at the position of the partition are deleted.

When the engine is at a high operating condition, once the valve opens, the gas flows into the four flow channels at the same time. The gas from the outlets of both the left inner flow channel and the right inner flow channel does work on the turbine impeller in a range of an entire circle; and the gas from both the left outer flow channel and the right outer flow channel does work on the turbine impeller in a range from an angle of one end of the partition to 360° in a cross section.

When the engine is at the high operating condition, the gas flows into the four flow channels at the same time, which effectively utilizes the pulse energy of the exhaust gas. Besides, the arrangement of the cascades further improves the availability of the energy of the exhaust pulse.

When the engine is at a low operating condition, the gas only flows into two flow channels, and the turbine fully use the energy of the exhaust pulse. Thus, the effective utilization of the energy of exhaust pulse of the engine at a high or low operating condition is achieved.

Because of the arrangement of the partition at the outlet of the turbine housing, the gas does work on the turbine impeller from the left inner flow channel, right inner flow channel, left outer flow channel, and right outer flow channel at different circumferential directions, thus, the gas flow at the inlet of the turbine impeller becomes more even, and the flow loss at outlets of different flow channels is minimized, thereby improving the efficiency of the turbine impeller.

The invention is based on the conventional exhaust manifold and the double channeled turbine housing, considers the exhaust system and the turbine device as a whole system, and according to different operating conditions of the engine, divides the exhaust manifold and the turbine housing into four different flow areas, respectively.

When the engine is at the high operating condition, the gas flows into the four flow channels at the same time, which effectively utilizes the pulse energy of the exhaust gas. Besides, the arrangement of the cascades further improves the availability of the energy of the exhaust pulse. When the engine is at a low operating condition, the gas only flows into two flow channels, and the turbine fully use the energy of the exhaust pulse. Thus, the effective utilization of the energy of exhaust pulse of the engine at a high or low operating condition is achieved. Because of the arrangement of the partition at the outlet of the turbine housing, the gas does work on the turbine impeller from the different flow channels at different circumferential directions, thus, the gas flow at the inlet of the turbine impeller becomes more even, thereby improving the efficiency of the turbine impeller.

Figure 1:
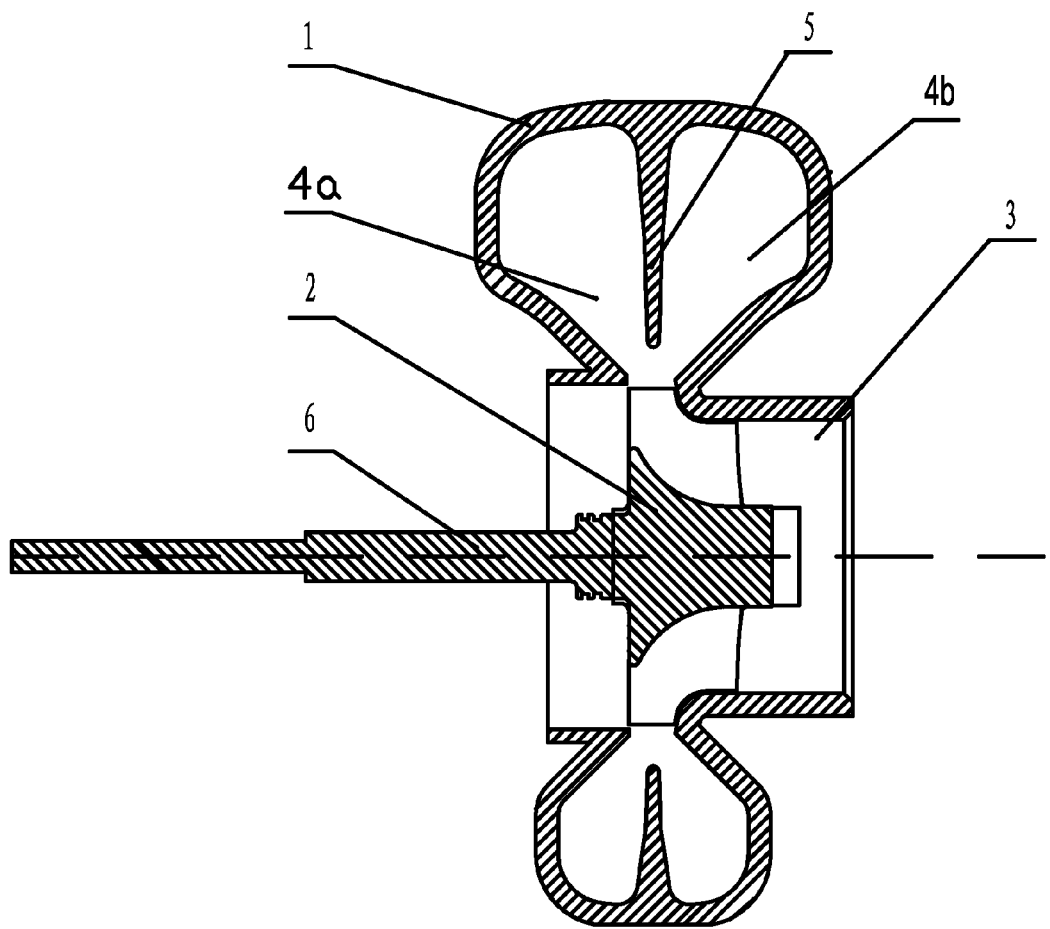
FIG. 1 is a structure diagram of a double channeled turbine housing in the prior art.

In the drawings, the following reference numbers are used: 1. Turbine housing; 2. Turbine impeller; 3. Gas outlet; 4a. Left flow channel; 4b. Right flow channel; 5. Middle partition; 6. Turbine shaft; 7. Arced partition; 8. Inner surface of turbine housing; 9. Left outer flow channel; 10. Right outer flow channel; 11. Left inner flow channel; 12. Right inner flow channel; 13. Static cascade; 14. Outlet of turbine housing; 15. First mounting plate; 16. Exhaust manifold; 17. Outlet hole; 18. Valve; 19. Inlet hole; 20. Second mounting plate; 21. Control system; 22, 23. Partition at the outlet of turbine housing; 25. Outer exhaust channel; and 26. Inner exhaust channel.

DETAILED DESCRIPTION OF THE EMBODIMENTS

Example 1

Figure 2:
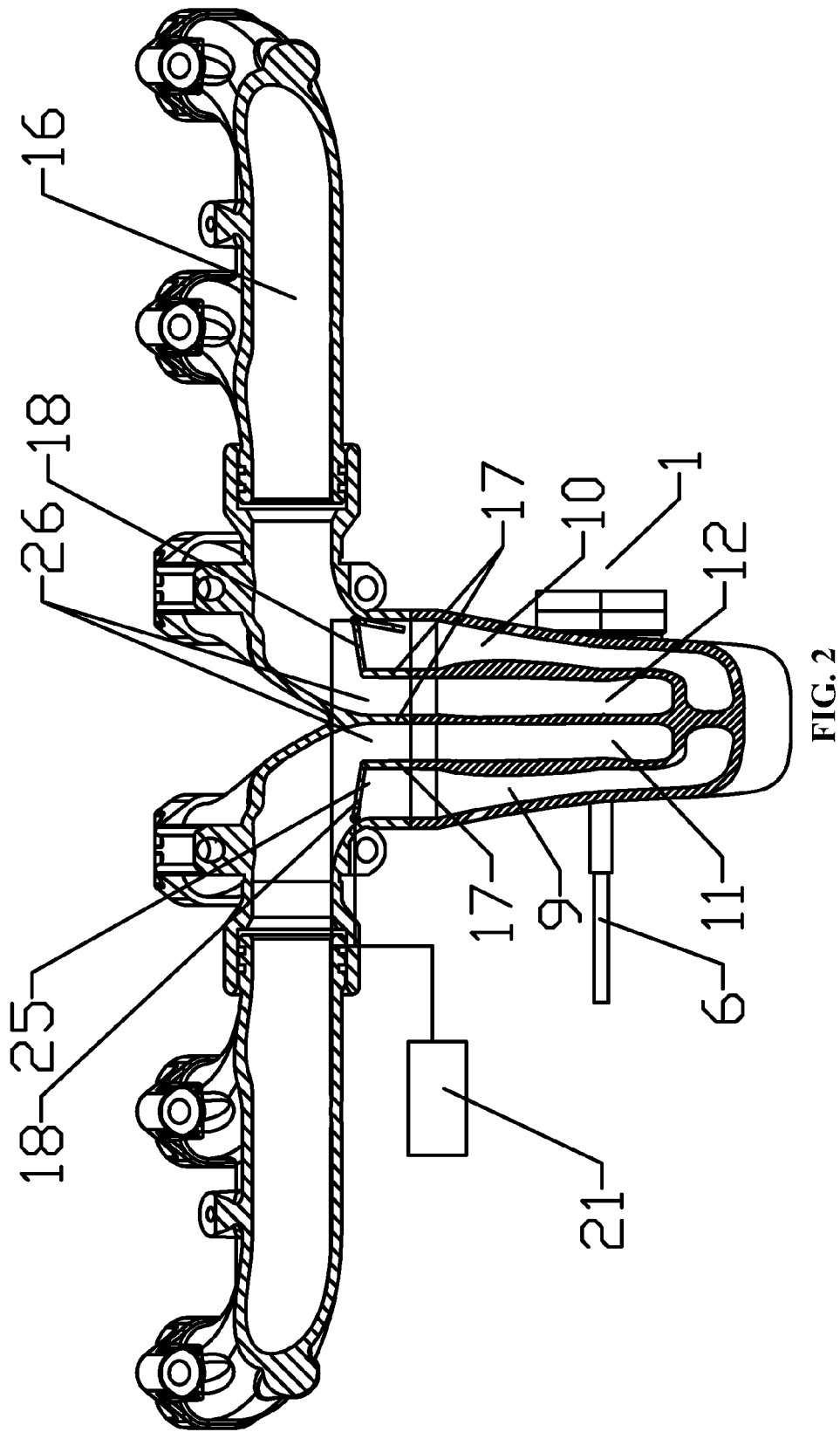
FIG. 2 is an assembly diagram of a turbine and an exhaust manifold in accordance with one embodiment of the invention.

As shown in FIG. 2, a turbine device comprises: a turbine housing 1. An inlet of the turbine housing 1 is connected to an exhaust manifold 16.

Figure 3:
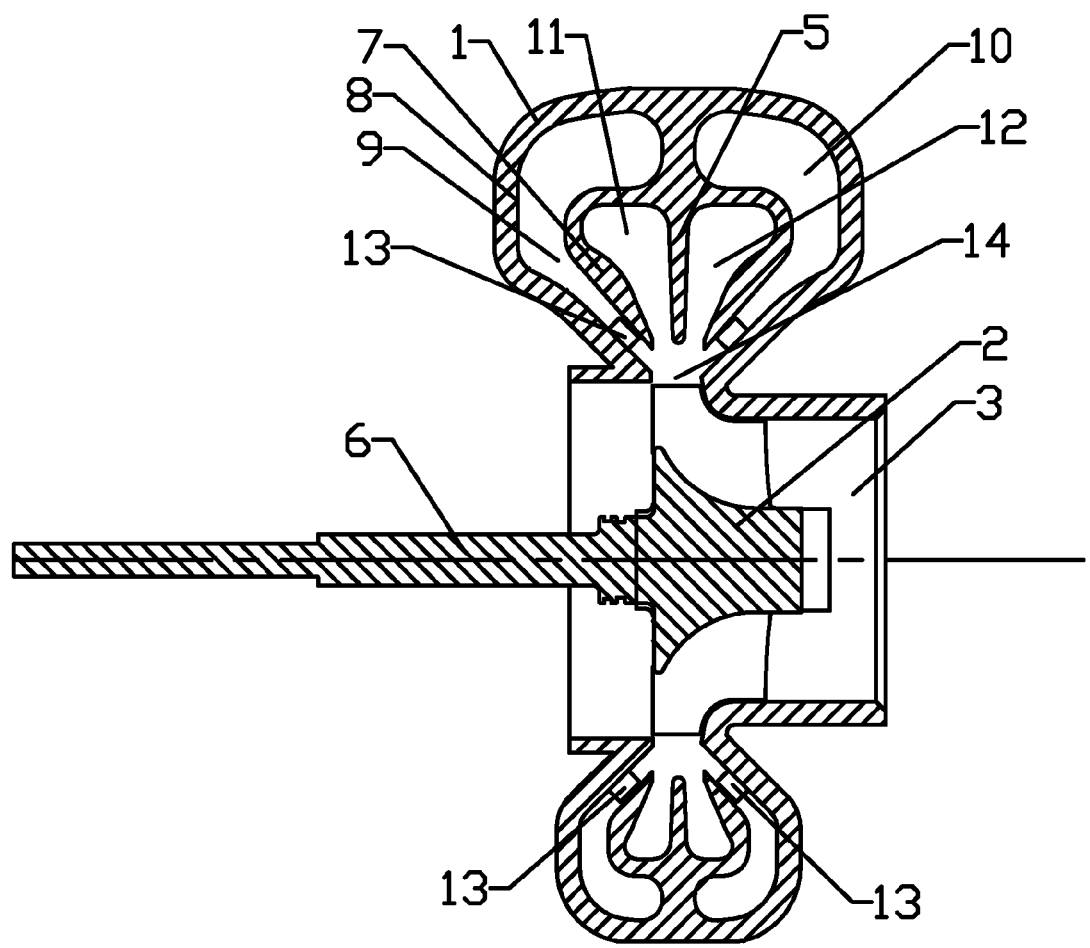
FIG. 3 is a structure diagram of a turbine in accordance with one embodiment of the invention.

As shown in FIG. 3, a turbine impeller 2 and a gas outlet 3 are arranged inside the turbine housing 1. A turbine shaft 6 is arranged on the turbine impeller 2. A flow channel is arranged inside the turbine housing 1. An outlet 14 of the turbine housing is arranged on the flow channel close to the turbine impeller 2. A middle partition 5 is disposed inside the flow channel and divides the flow channel into a left flow channel and a right flow channel.

An arced partition 7 is arranged in both the left flow channel and the right flow channel. One end of the arced partition 7 is in a rigid connection with the middle partition 5, and the other end of the arced partition 7 is close to the outlet 14 of the turbine housing.

The arced partition 7 inside the left flow channel divides the left flow channel into a left outer flow channel 9 and a left inner flow channel 11.

The arced partition 7 inside the right flow channel divides the right flow channel into a right outer flow channel 10 and a right inner flow channel 12.

The left outer flow channel 9, the left inner flow channel 11, the right outer flow channel 10, and the right inner flow channel 12 are all connected to the outlet 14 of the turbine housing.

The arced partition 7, the middle partition 5, and the turbine housing 1 are welded as a whole.

To maintain a good aerodynamic performance inside the flow channel of the turbine housing, the arced partition 7 is tapered along a direction of the flow, which is the same as the inner surface of the turbine housing. The shape of an inner arced surface and an outer arced surface of the arced partition is the same as the shape of the inner surface of the turbine housing.

To minimize the flow loss in the outlet of the turbine housing, the outer arced surface of the arced partition 7 in the left outer flow channel 9 is in parallel with an inner arced surface of the left outer flow channel 9 of the turbine housing at a position close to the outlet of the turbine housing 14.

The inner arced surface of the arced partition 7 in both the left inner flow channel 11 and the right inner flow channel 12 is in parallel with a wall surface of the middle partition 5 in the left inner flow channel 11 and the right inner flow channel 12 at the position close to the outlet 14 of the turbine housing, respectively.

A partition inside the flow channel comprises: a middle partition which divides the flow channel into a right flow channel and a left flow channel; and an arced partition which further divides the left flow channel and the left flow channel.

When the motor is at a high operating condition of the motor, to control the angle of the waste gas flowing into the turbine impeller from the left outer flow channel and the right outer flow channel, and to fully utilize the energy of the waste gas, a static cascade 13 is arranged in an entire circle in each of the left outer flow channel 9 and the right outer flow channel 10 close to the outlet 14 of the turbine housing. A blade of the static cascade 13 is inclinedly arranged at an outlet of the outer flow channel The blade of the static cascade 13 is arranged on the inner surface of the turbine housing by welding.

In order to maintain a good pulse wave of the engine at a low operating condition, a total cross sectional area of the left inner flow channel 11 and the right inner flow channel 12 is ⅓-½ of a total cross sectional area of the flow channel.

Figure 4:
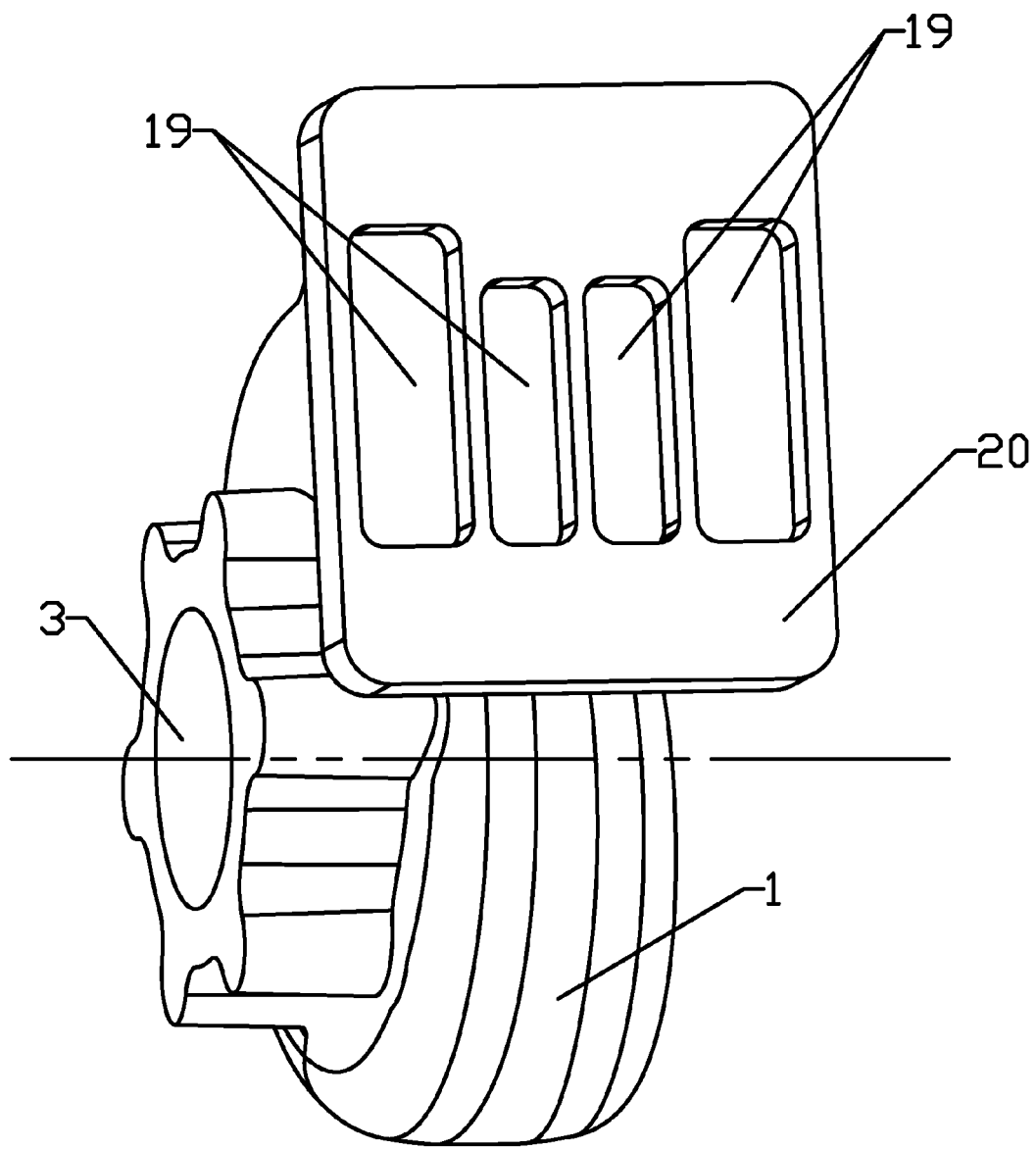
FIG. 4 is an external structure diagram of a turbine housing in accordance with one embodiment of the invention.

As shown in FIG. 4, a first mounting plate 20 is disposed at the inlet of the turbine housing 1. The first mounting plate 20 comprises inlet holes 19 respectively connected to the left outer flow channel 9, the right outer flow channel 10, the left inner flow channel 11, and the right inner flow channel 12.

Figure 5:
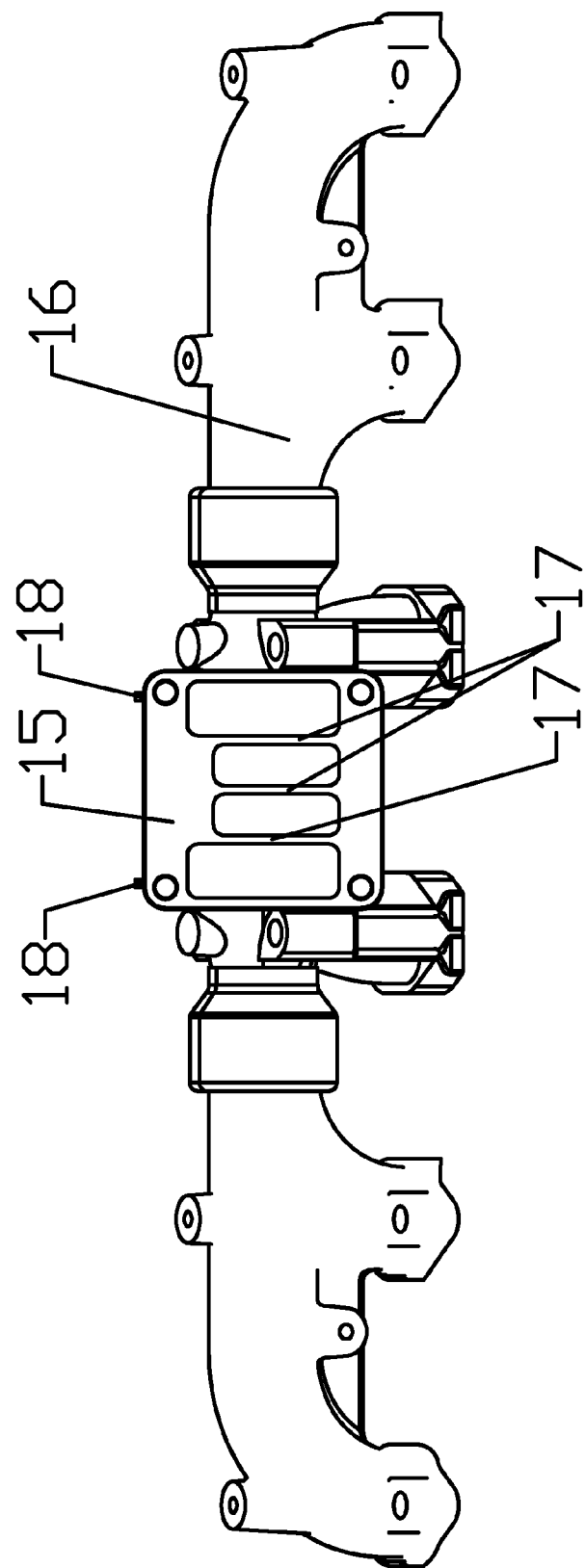
FIG. 5 is a structure diagram of an exhaust manifold in accordance with one embodiment of the invention.

As shown in FIG. 5, in order to match with the turbine, a second mounting plate 15 is disposed at an outlet of the exhaust manifold 16. The second mounting plate 15 comprises outlet holes 17. The number and arrangement of the outlet holes 17 are the same as the number and arrangement of the inlet holes 19 of the first mounting plate 20.

The exhaust manifold 16 comprises four exhaust channels, the four exhaust channels comprising two outer exhaust channels 25 and two inner exhaust channels 26. Each of the outer exhaust channel 25 is connected to the left outer flow channel 9 and the right outer flow channel 10 of the turbine housing, respectively; and each of the inner exhaust channel 26 is connected to the left inner flow channel and the right inner flow channel 12 of the turbine housing, respectively.

The first mounting plate 20 and the second mounting plate 15 are fixed together by blots.

Figure 6:
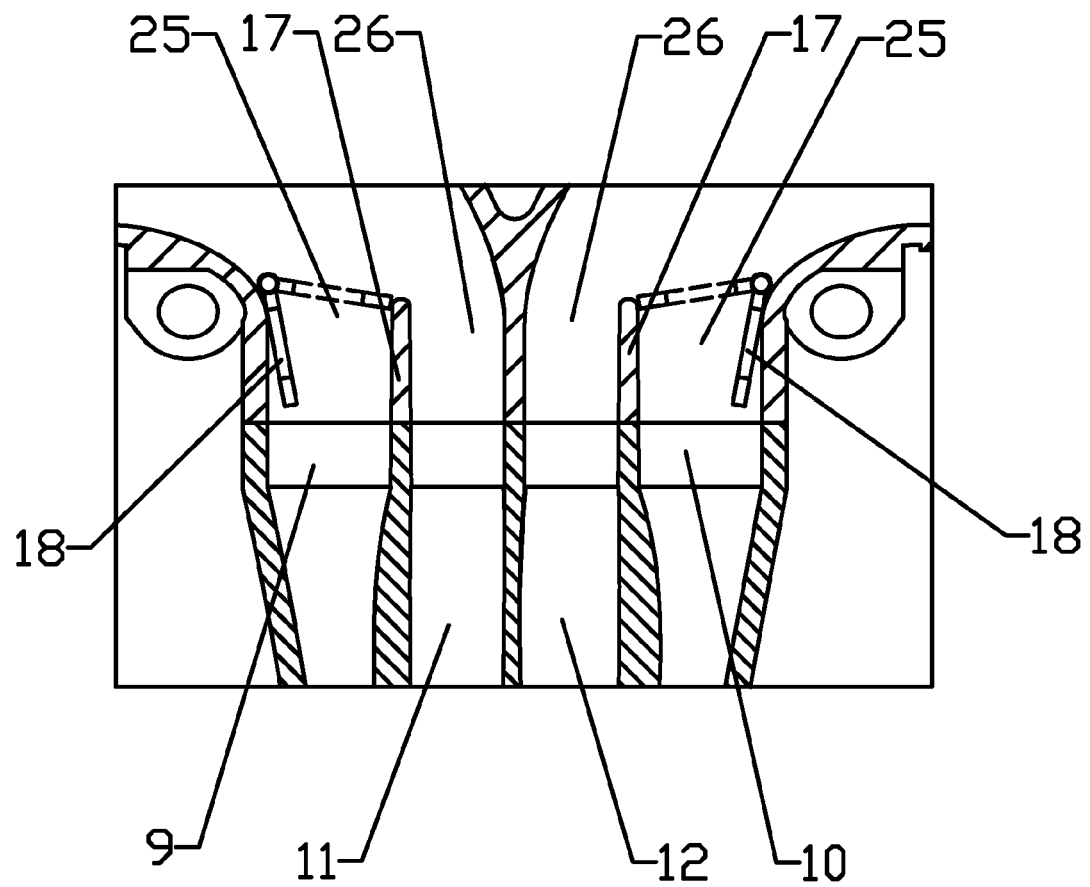
FIG. 6 is a structure diagram of at a connection of an inlet of an turbine housing and an outlet of an exhaust manifold in accordance with one embodiment of the invention.

As shown in FIG. 6, a valve is disposed in each outer exhaust channel 25 at a position close to the outlet of the exhaust manifold. One end of the valve 18 is in hinge joint with a wall of the exhaust manifold 16. An external control system 21 controls the open and close of the valve according to the preset parameters.

When the engine is at a high operating condition, the vale 18 opens, as shown by the solid line, the gas flows into the four flow channels of the turbine housing at the time. When the engine is at a low operating condition, the valve 18 closes, as shown by the dash line, so that the gas flows into the left inner flow channel 11 and the right inner flow channel 12.

When the engine is at the high operating condition, the gas flows into the four flow channels at the same time, which effectively utilizes the pulse energy of the exhaust gas. Besides, the arrangement of the cascades further improves the availability of the energy of the exhaust pulse.

When the engine is at a low operating condition, the gas only flows into two flow channels, and the turbine fully use the energy of the exhaust pulse. Thus, the effective utilization of the energy of exhaust pulse of the engine at a high or low operating condition is achieved.

In the meanwhile, the well matched turbine and the exhaust manifold further improves the availability of the exhaust energy of the engine. This kind of turbine has a simplified structure, and can be made of the same kind of materials by the current welding and processing technology.

Example 2

Figure 7:
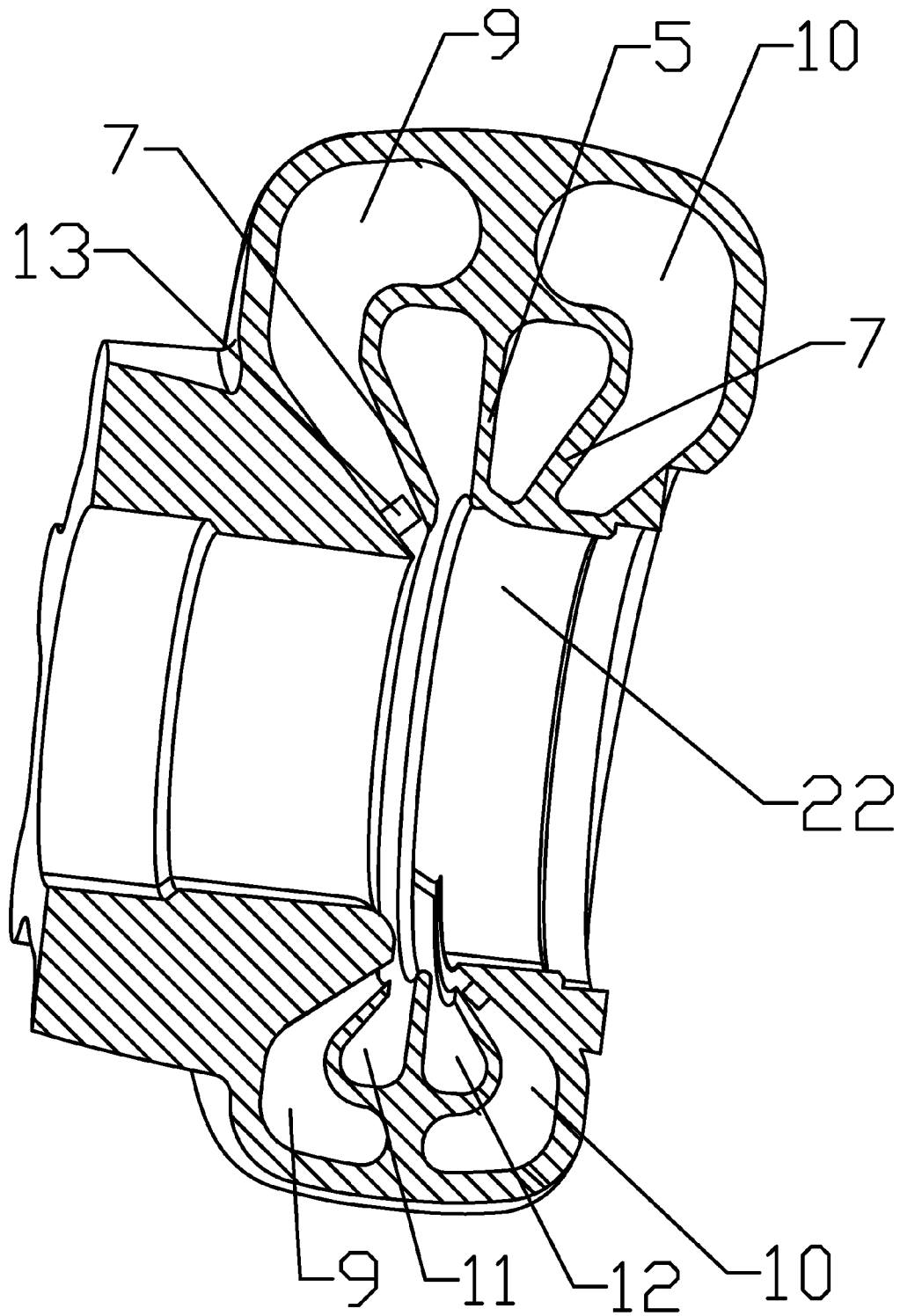
FIG. 7 is a structure diagram of a turbine device in accordance with one embodiment of the invention.
Figure 8:
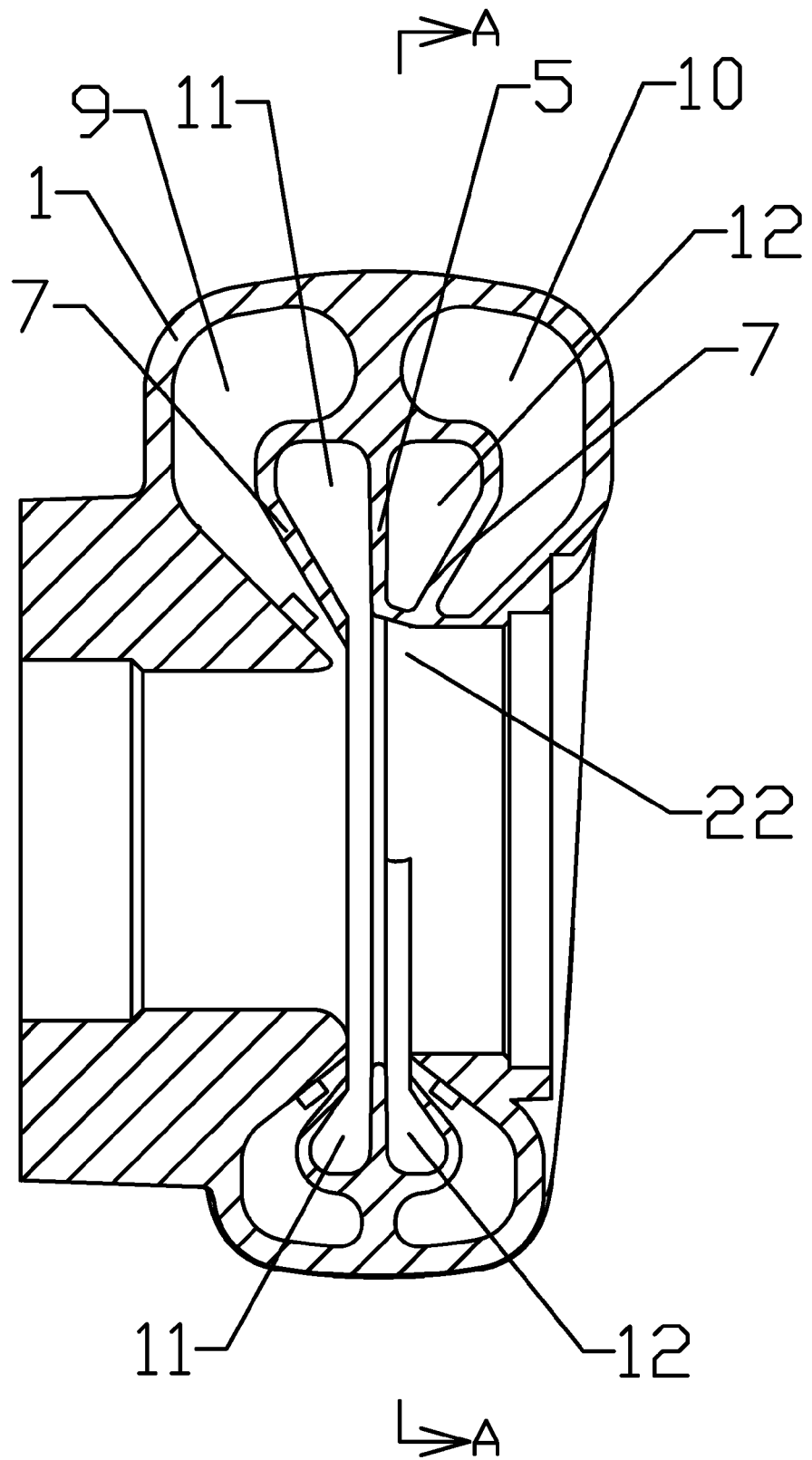
FIG. 8 is a cross-section view of flow channels of a turbine housing in accordance with one embodiment of the invention.

As shown in FIGS. 7 and 8, based on Example 1, a partition 22 is arranged in the right inner flow channel 12 and the right outer flow channel 10 close to the outlet 14 of the turbine housing. The original blades of the static cascade arranged at the position of the partition 22 are deleted.

Figure 9:
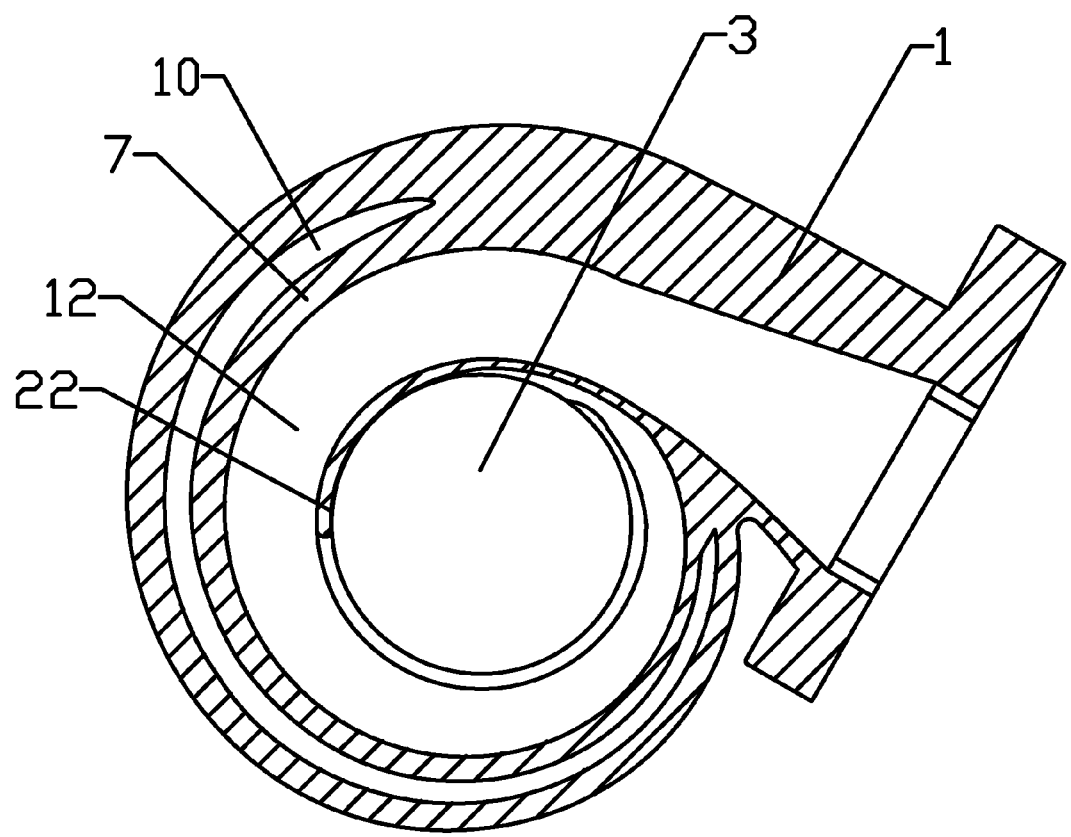
FIG. 9 is a cross-sectional view taken from line A-A of FIG. 8.

As shown in FIG. 9, a cross section of the partition 22 is in a shape of an arc, and a radian of the arc is 0-180°. An outlet of the right inner flow channel 12 and an outlet of the right outer flow channel 10 are sealed at a position of the partition 22.

When the valve 18 opens, the gas from outlets of both the left outer flow channel 9 and the left inner flow channel 11 does work on the turbine impeller 2 in a range of an entire circle. The gas from outlets of both the right outer flow channel 10 and the right inner flow channel 12 does work on the turbine impeller 2 in a range from an angle of one end of the partition 22 to 360° in a cross section.

When the valve closes, the gas is kept out of the left outer flow channel 9 and the right outer flow channel 10 and all flows into the left inner flow channel 11 and the right inner flow channel 12. The gas from the outlet of the left inner flow channel 11 does work on the turbine impeller 2 in a range of an entire circle; while the gas from the outlet of the right inner flow channel 12 does work on the turbine impeller in a range from an angle of one end of the partition 22 to 360° in a cross section.

When the engine is at the high operating condition, the gas flows into the four flow channels at the same time, which effectively utilizes the pulse energy of the exhaust gas. Besides, the arrangement of the cascades further improves the availability of the energy of the exhaust pulse.

When the engine is at a low operating condition, the gas only flows into two flow channels, and the turbine fully use the energy of the exhaust pulse. Thus, the effective utilization of the energy of exhaust pulse of the engine at a high or low operating condition is achieved.

Because of the arrangement of the partition 22 at the outlet of the turbine housing, the gas does work on the turbine impeller from the left and right flow channels at different circumferential directions, thus, the gas flow at the inlet of the turbine impeller becomes more even, and the flow loss at outlets of different flow channels is minimized, thereby improving the efficiency of the turbine impeller.

The well matched turbine and the exhaust manifold further improves the availability of the exhaust energy of the engine. This kind of turbine has a simplified structure, and can be made of the same kind of materials by the current welding and processing technology.

Example 3

Figure 10:
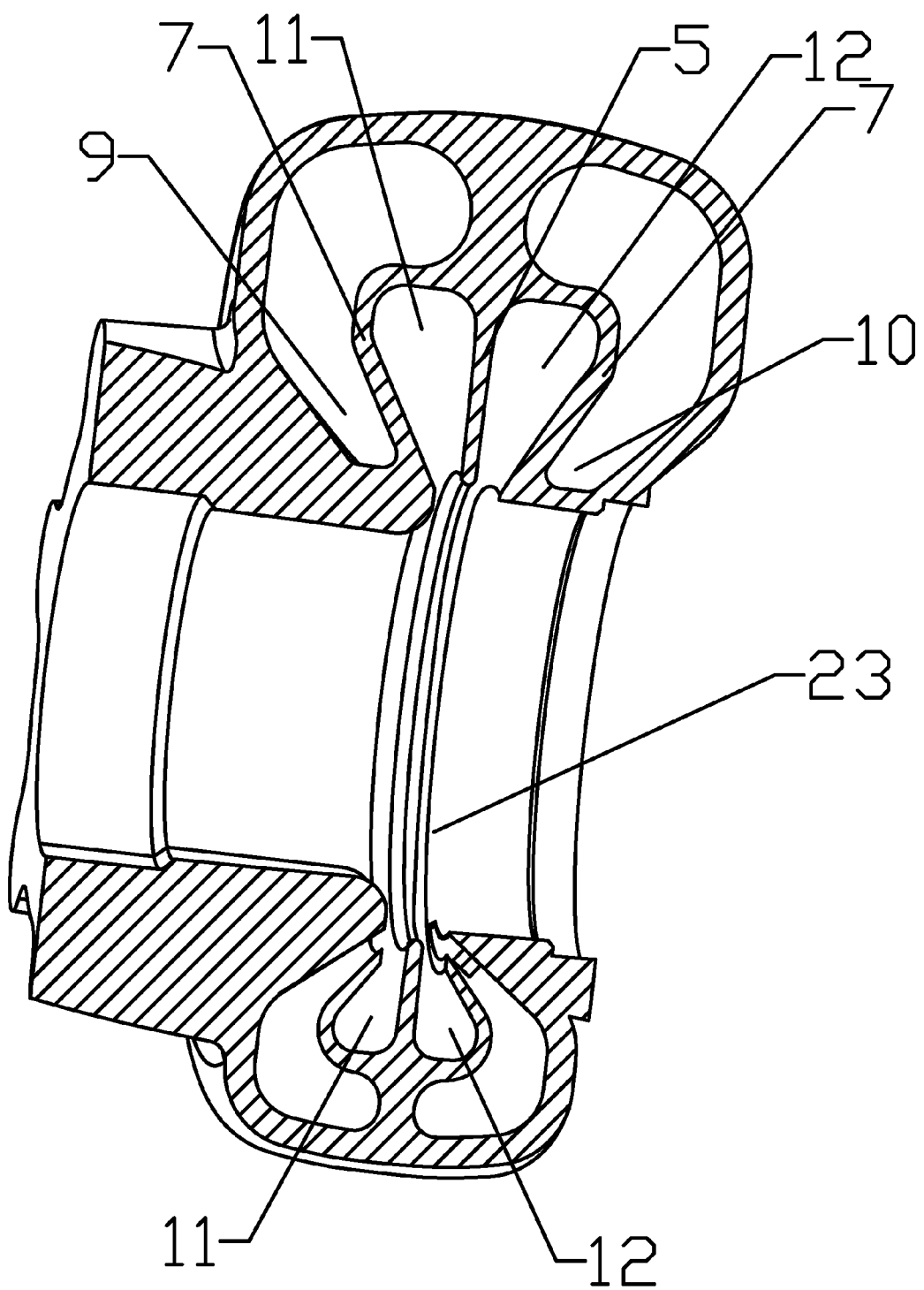
FIG. 10 is a structure diagram of a turbine device in accordance with one embodiment of the invention.

In view of Example 2 and based on Example 1, as shown in FIG. 10, a partition 23 is arranged symmetrically at an outlet of the left outer flow channel 9 and an outlet of the right outer flow channel 10. The original blades of the static cascade arranged at the position of the partition 23 are deleted. A cross section of the partition 23 is in a shape of an arc; and a radian of the arc is 0-180°.

When the engine is at a high operating condition, once the valve 18 opens, the gas flows into the four flow channels at the same time. The gas from the outlets of both the left inner flow channel 11 and the right inner flow channel 12 does work on the turbine impeller 2 in a range of an entire circle; and the gas from both the left outer flow channel 9 and the right outer flow channel 10 does work on the turbine impeller 2 in a range from an angle of one end of the partition 23 to 360° in a cross section.

When the engine is at the high operating condition, the gas flows into the four flow channels at the same time, which effectively utilizes the pulse energy of the exhaust gas. Besides, the arrangement of the cascades further improves the availability of the energy of the exhaust pulse.

When the engine is at a low operating condition, the gas only flows into two flow channels, and the turbine fully use the energy of the exhaust pulse. Thus, the effective utilization of the energy of exhaust pulse of the engine at a high or low operating condition is achieved.

Because of the arrangement of the partition 23 at the outlet of the turbine housing, the gas does work on the turbine impeller from the left inner flow channel 11, right inner flow channel 12, left outer flow channel 9, and right outer flow channel 10 at different circumferential directions, thus, the gas flow at the inlet of the turbine impeller becomes more even, and the flow loss at outlets of different flow channels is minimized, thereby improving the efficiency of the turbine impeller.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A turbine device, comprising:
    a turbine housing, the turbine housing comprising an inlet, a flow channel, an outlet, a middle partition, and an arced partition;
    a turbine impeller;
    a gas outlet; and
    an exhaust manifold;
wherein:
    the turbine impeller and the gas outlet are arranged inside the turbine housing;
    the exhaust manifold is connected to the inlet of the turbine housing;
    the flow channel is arranged inside the turbine housing;
    the outlet of the turbine housing is arranged on the flow channel close to the turbine impeller;
    the middle partition is disposed inside the flow channel and divides the flow channel into a left flow channel and a right flow channel;
    the arced partition is arranged in both the left flow channel and the right flow channel; one end of the arced partition is in a rigid connection with the middle partition, and the other end of the arced partition is close to the outlet of the turbine housing;
    the arced partition arranged inside the left flow channel divides the left flow channel into a left outer flow channel and a left inner flow channel;
    the arced partition arranged inside the right flow channel divides the right flow channel into a right outer flow channel and a right inner flow channel;
    the left outer flow channel, the left inner flow channel, the right outer flow channel, and the right inner flow channel are all connected to the outlet of the turbine housing;
    a static cascade is arranged in a circle in each of the left outer flow channel and the right outer flow channel close to the outlet of the turbine housing; and
    a blade of the static cascade is inclinedly arranged at an outlet of the outer flow channel.
2. The turbine device of claim 1, wherein the blade of the static cascade is arranged on an inner surface of the turbine housing by welding.

3. The turbine device of claim 1, wherein a total cross sectional area of the left inner flow channel and the right inner flow channel is 1/3-1/2 of a total cross sectional area of the flow channel.

4. The turbine device of claim 1, wherein
a first mounting plate is disposed at the inlet of the turbine housing; and
the first mounting plate comprises inlet holes respectively connected to the left outer flow channel, the right outer flow channel, the left inner flow channel, and the right inner flow channel.

5. The turbine device of claim 1, wherein
an outer arced surface of the arced partition in the left outer flow channel is in parallel with an inner arced surface of the left outer flow channel of the turbine housing at a position close to the outlet of the turbine housing; and
an inner arced surface of the arced partition in both the left inner flow channel and the right inner flow channel is in parallel with a wall surface of the middle partition at the position close to the outlet of the turbine housing.

6. The turbine device of claim 5, wherein the blade of the static cascade is arranged on an inner surface of the turbine housing by welding.

7. The turbine device of claim 5, wherein a total cross sectional area of the left inner flow channel and the right inner flow channel is 1/3-1/2 of a total cross sectional area of the flow channel.

8. The turbine device of claim 5, wherein
a first mounting plate is disposed at the inlet of the turbine housing; and
the first mounting plate comprises inlet holes respectively connected to the left outer flow channel, the right outer flow channel, the left inner flow channel, and the right inner flow channel.

9. The turbine device of claim 8, wherein
a second mounting plate is disposed at an outlet of the exhaust manifold and connected to the first mounting plate;
the second mounting plate comprises outlet holes ; and
a number and arrangement of the outlet holes are the same as a number and arrangement of the inlet holes of the first mounting plate.

10. The turbine device of claim 9, wherein
the exhaust manifold comprises four exhaust channels comprising two outer exhaust channels and two inner exhaust channels;
the outer exhaust channels are connected to the left outer flow channel and the right outer flow channel, respectively; and
the inner exhaust channels are connected to the left inner flow channel and the right inner flow channel, respectively.

11. The turbine device of claim 10, wherein
a valve is disposed in each outer exhaust channel at a position close to the outlet of the exhaust manifold; and
one end of the valve is in hinge joint with a wall of the exhaust manifold.

12. A turbine device, comprising:
a turbine housing, the turbine housing comprising an inlet, a flow channel, an outlet, a middle partition, and an arced partition;
a turbine impeller;
a gas outlet; and
an exhaust manifold;
wherein:
the turbine impeller and the gas outlet are arranged inside the turbine housing;
the exhaust manifold is connected to the inlet of the turbine housing;
the flow channel is arranged inside the turbine housing;
the outlet of the turbine housing is arranged on the flow channel close to the turbine impeller;
the middle partition is disposed inside the flow channel and divides the flow channel into a left flow channel and a right flow channel;
the arced partition is arranged in both the left flow channel and the right flow channel; one end of the arced partition is in a rigid connection with the middle partition, and the other end of the arced partition is close to the outlet of the turbine housing;
the arced partition arranged inside the left flow channel divides the left flow channel into a left outer flow channel and a left inner flow channel;
the arced partition arranged inside the right flow channel divides the right flow channel into a right outer flow channel and a right inner flow channel;
the left outer flow channel, the left inner flow channel, the right outer flow channel, and the right inner flow channel are all connected to the outlet of the turbine housing;
a partition is arranged in the right inner flow channel and the right outer flow channel close to the outlet of the turbine housing;
a cross section of the partition is in a shape of an arc; and
a radian of the arc is within the range of 0-180°.

13. The turbine device of claim 12, wherein an outlet of the right inner flow channel and an outlet of the right outer flow channel corresponding to the partition are sealed.

14. The turbine device of claim 12, wherein
an outer arced surface of the arced partition in the left outer flow channel is in parallel with an inner arced surface of the left outer flow channel of the turbine housing at a position close to the outlet of the turbine housing; and
an inner arced surface of the arced partition in both the left inner flow channel and the right inner flow channel is in parallel with a wall surface of the middle partition at the position close to the outlet of the turbine housing.

15. The turbine device of claim 14, wherein an outlet of the right inner flow channel and an outlet of the right outer flow channel corresponding to the partition are sealed.

16. A turbine device, comprising:
a turbine housing, the turbine housing comprising an inlet, a flow channel, an outlet, a middle partition, and an arced partition;
a turbine impeller;
a gas outlet; and
an exhaust manifold;
wherein:
the turbine impeller and the gas outlet are arranged inside the turbine housing;
the exhaust manifold is connected to the inlet of the turbine housing;
the flow channel is arranged inside the turbine housing;
the outlet of the turbine housing is arranged on the flow channel close to the turbine impeller;
the middle partition is disposed inside the flow channel and divides the flow channel into a left flow channel and a right flow channel;
the arced partition is arranged in both the left flow channel and the right flow channel; one end of the arced partition is in a rigid connection with the middle partition, and the other end of the arced partition is close to the outlet of the turbine housing;

the arced partition arranged inside the left flow channel divides the left flow channel into a left outer flow channel and a left inner flow channel;

the arced partition arranged inside the right flow channel divides the right flow channel into a right outer flow channel and a right inner flow channel;

the left outer flow channel, the left inner flow channel, the right outer flow channel, and the right inner flow channel are all connected to the outlet of the turbine housing;

a partition is arranged symmetrically at an outlet of the left outer flow channel and an outlet of the right outer flow channel;

a cross section of the partition is in a shape of an arc; and a radian of the arc is within the range of 0-180°.

17. The turbine device of claim 16, wherein an outer arced surface of the arced partition in the left outer flow channel is in parallel with an inner arced surface of the left outer flow channel of the turbine housing at a position close to the outlet of the turbine housing; and an inner arced surface of the arced partition in both the left inner flow channel and the right inner flow channel is in parallel with a wall surface of the middle partition at the position close to the outlet of the turbine housing.

\* \* \* \* \*